US009467725B2

(12) United States Patent
Lee et al.

(10) Patent No.: US 9,467,725 B2
(45) Date of Patent: Oct. 11, 2016

(54) METHOD AND SYSTEM FOR DETECTING UNAUTHORIZED USE OF A SET TOP BOX USING WEATHER PROFILES

(75) Inventors: Sean S. Lee, Potomac, MD (US); Kuriacose Joseph, Gaithersburg, MD (US); Scott D. Casavant, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 701 days.

(21) Appl. No.: 13/340,033

(22) Filed: Dec. 29, 2011

(65) Prior Publication Data
US 2013/0174192 A1 Jul. 4, 2013

(51) Int. Cl.
*H04N 7/10* (2006.01)
*H04N 7/025* (2006.01)
*H04N 21/258* (2011.01)
*H04N 21/442* (2011.01)
*H04N 21/4627* (2011.01)
*H04N 21/61* (2011.01)
*H04N 21/6334* (2011.01)
*H04N 21/658* (2011.01)

(52) U.S. Cl.
CPC .. *H04N 21/25841* (2013.01); *H04N 21/25833* (2013.01); *H04N 21/44209* (2013.01); *H04N 21/4627* (2013.01); *H04N 21/6143* (2013.01); *H04N 21/6334* (2013.01); *H04N 21/6582* (2013.01)

(58) Field of Classification Search
CPC ..................... H04N 21/8126; H04N 21/4432; H04N 21/4436
USPC ...................................................... 725/32–36
See application file for complete search history.

(56) References Cited

U.S. PATENT DOCUMENTS

| 7,765,570 | B2* | 7/2010 | Batrouny et al. ............... 725/49 |
| 2002/0023010 | A1 | 2/2002 | Rittmaster et al. |
| 2003/0197809 | A1* | 10/2003 | Gangitano .................... 348/570 |
| 2004/0049785 | A1* | 3/2004 | Grzeczkowski et al. ....... 725/46 |
| 2004/0072577 | A1 | 4/2004 | Myllymaki et al. |
| 2006/0064726 | A1* | 3/2006 | Loner ............................. 725/68 |
| 2008/0242328 | A1 | 10/2008 | Kummer et al. |
| 2008/0313671 | A1* | 12/2008 | Batrouny et al. ............... 725/40 |
| 2010/0199303 | A1* | 8/2010 | Kummer et al. ............... 725/33 |
| 2010/0251312 | A1* | 9/2010 | Albano et al. .................. 725/78 |

(Continued)

FOREIGN PATENT DOCUMENTS

WO        98/47237 A1    10/1998

OTHER PUBLICATIONS

Invitation to Pay Additional Fees and, Where Applicable, Protest Fee with Annex of the Results of the Partial International Search dated Mar. 21, 2013 in International Application No. PCT/US2012/071713 filed Dec. 27, 2012 by Sean S. Lee et al.
International Search Report and Written Opinion dated Sep. 23, 2013 in International Application No. PCT/US2012/071713 filed Dec. 27, 2012 by Sean S. Lee et al.

*Primary Examiner* — Jason Salce
(74) *Attorney, Agent, or Firm* — Harness, Dickey & Pierce, P.L.C.

(57) ABSTRACT

A system and method for determining unauthorized use of a set top box includes a set top box that receives a profile of weather conditions in a geographic area, generating a weather log, comparing the weather log and the profile and disabling the set top box from receiving signals in response to comparing. A head end and a plurality of other set top boxes may be used to gather the weather data to form the profile.

19 Claims, 6 Drawing Sheets

(56) References Cited

U.S. PATENT DOCUMENTS

| | | |
|---|---|---|
| 2011/0004893 A1 | 1/2011 | Borislow et al. |
| 2011/0281517 A1* | 11/2011 | Ukkadam .................... 455/3.06 |
| 2011/0309933 A1* | 12/2011 | Marino .................... 340/539.32 |
| 2012/0110614 A1* | 5/2012 | Whitley .......................... 725/32 |
| 2012/0326834 A1* | 12/2012 | Kennedy et al. .............. 340/3.1 |

* cited by examiner

METHOD AND SYSTEM FOR DETECTING UNAUTHORIZED USE OF A SET TOP BOX USING WEATHER PROFILES

TECHNICAL FIELD

The present disclosure relates generally communicating between a service provider and a user device, and, more specifically, to disabling service of a set top box based upon actual and historic weather data.

BACKGROUND

The statements in this section merely provide background information related to the present disclosure and may not constitute prior art.

Satellite programming has become increasingly popular due to the wide variety of content and services available. Typically, a set top box is configured to receive satellite programming in response to conditional access provided through the use of encryption and a conditional access module. When a consumer has proper conditional access credentials, the signals are decrypted so that the output may be viewed by the user.

Satellite television must follow various broadcasting rules set by the government. Other rules are contractually negotiated with various content providers. Such rules provide limitations for users based on geography. A satellite television provider may have rights to distribute content to a particular country such as the United States while not having authorization to provide broadcast service into adjacent countries such as Canada and Mexico. Because satellite beams do not exactly follow the borders, the satellite beams may overlap to a certain extent. Further, geographic restrictions may be provided for various types of signals including local signals that are not to be received outside of a particular designated marketing area.

Further, providers of various equipment may not be authorized to distribute the equipment in particular geographic areas.

Preventing unauthorized use is important from a business perspective.

SUMMARY

The present disclosure provides a system and method for reducing unauthorized use of set top boxes in a particular area.

In one aspect of the disclosure, a method includes receiving a profile of weather conditions in a geographic area at a set top box, generating a weather log at the set top box, comparing the profile to the weather log and disabling the set top box from receiving signals in response to comparing.

In a further aspect of the disclosure, a system for determining unintended use of a set top box includes a set top box that receives a profile of weather conditions in a geographic area, generating a weather log, comparing the weather log and the profile and disabling the set top box from receiving signals in response to comparing. A head end and a plurality of other set top boxes may be used to gather the weather data to form the profile.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
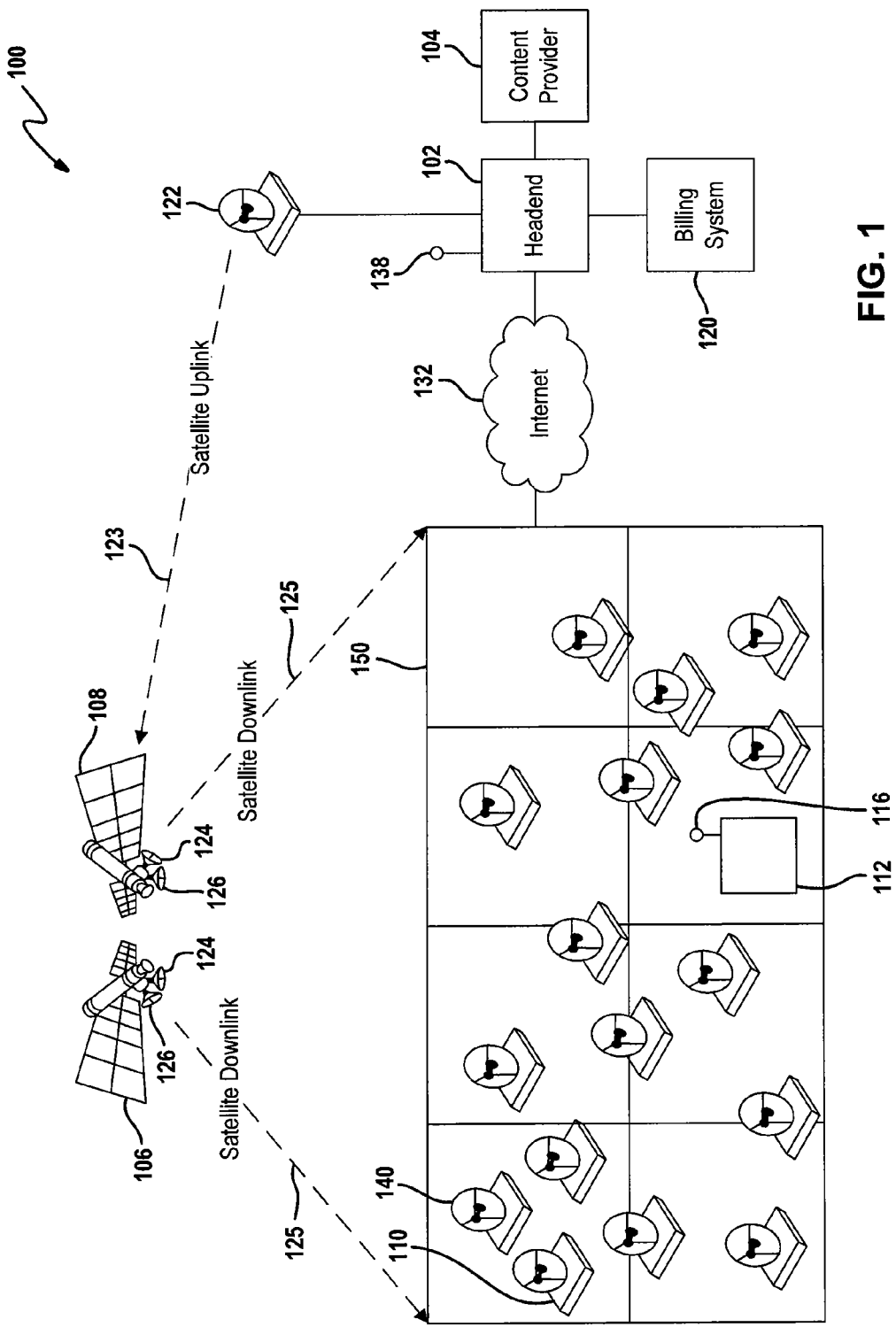
FIG. 1 is a diagrammatic representation of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The following description refers to communicating content, data, control signals, data objects and the like. The content data, control signals, and data objects are communicated electronically using electrical or optical control signals.

Referring now to FIG. 1, a content communication system 100 includes a head end 102 that is used as a processing, security and transmission source. Of course the various functions may be separated. A plurality of content providers, one of which is shown at reference numeral 104 and a first satellite 106. A second satellite 108 may also be incorporated into the system. The satellites 106, 108 may be used to communicate different types of data or different portions of various content from the head end 102.

The system 100 also includes a plurality of fixed user devices 110 such as integrated receiver/decoders (IRDs). The user devices may be referred to as fixed user devices because they are typically associated with a display mounted within a home or business. Wireless communications are exchanged between the head end 102 and the user devices 110 through one or more of the satellites 106, 108. The wireless communications may take place at any suitable frequency, such as but not limited to, for example, Ka band and/or Ku-band frequencies. The satellites 106, 108 may have different transponders associated therewith. The satellites 106, 108 may be located at different orbital positions and thus the angle relative to a user may be different.

A mobile user device 112 may also be incorporated into the system. The mobile user device 112 may include, but is not limited to, a cell phone, a personal digital assistant, a portable media player, a laptop computer, or a vehicle-based device. It should be noted that several mobile devices 112 and several fixed user devices 110 may be used in the communication system 100. The mobile devices 112 may each have a separate antenna generally represented by antenna 116. The mobile devices 112 may have geographic location determination modules that determine the location of the mobile device using global positioning satellites or cellular triangulation techniques.

The head end 102 may have a billing system 120 associated therewith. In FIG. 1, the billing system is illustrated as separate. However, the billing system 120 may be included within the head end 102. The billing system 120 keeps track of the various user devices and accounts. Each user device, particularly the fixed user devices 110, has a billing address or service address associated therewith. The service address may be a street address, a postal code, or both. In the present disclosure, the weather conditions for the registered service address and the actual conditions at the user device are compared as will be described below.

The head end 102 may communicate with the satellites 106, 108 using an uplink antenna 122. The uplink antenna 122 generates a satellite uplink 123 which is received by a receiving antenna 124 on the satellite. The satellite generates a downlink 125 using a downlink antenna 126. The downlinks 125 may provide regional coverage such as for the Continental United States or provide spot beam coverage for a specific geographic location within a larger geographic area.

Various types of data such as security information, encryption-decryption information, content, or content portions may be communicated terrestrially via the satellites 106, 108. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 138 is illustrated for wireless terrestrial communication to the mobile user device 112. In addition, data such as weather data and other call back signals may be communicated to the head end from the fixed user devices 110 and the mobile user devices 112.

As will be further described below, not all of the fixed user devices 110 or mobile user devices 112 may be in communication with the network 132 for providing data or other call back signals. Unconnected devices have a higher potential of being misused.

Data or content provided to head end 102 from the content provider 104 may be transmitted, for example, via the uplink antenna 122 to the satellites 106,108, one or more of which may be a geosynchronous or geo-stationary satellite, that, in turn, rebroadcast the information over broad geographical areas on the earth that include the user devices 110, 112. The satellites may have inter-satellite communication links for relaying data between the satellites 106 and 108. Among other things, the example head end 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the head end 102 and known to the user devices 110, 112 authorized to view and/or playback the asset. In the illustrated example communication system 100, for each asset the head end 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption. Thus, a user device may be deauthorized by not allowing a user device access to the proper control word.

The control word packet may be communicated with other control data as a conditional access packet (CAP). The CAP may be used to provide tuning data, geographic location profiles or other data.

The user devices 110, 112 are displayed in a geographic area represented by the grid 150. A plurality of geographic areas is defined by the grid. The following disclosure uses the measured weather conditions at the user device in comparison with weather profile data generated from a plurality of user devices in the geographic areas to determine an unauthorized use. In the following example, the weather conditions are determined by the signal strength of the received satellite signal at the user device. Of course, other types of representations of weather may also be used such as the downlink carrier to noise ratio (CNR) or another type of representation. As was mentioned above, the set top boxes that are in communication with the network 132 may communicate various data to the head end 102. The population of set top boxes may report the weather condition in the form of the signal strength at various times of the day. A log of signal strengths may be stored over time within a set top box and periodically be reported back to the head end 102.

Figure 2:
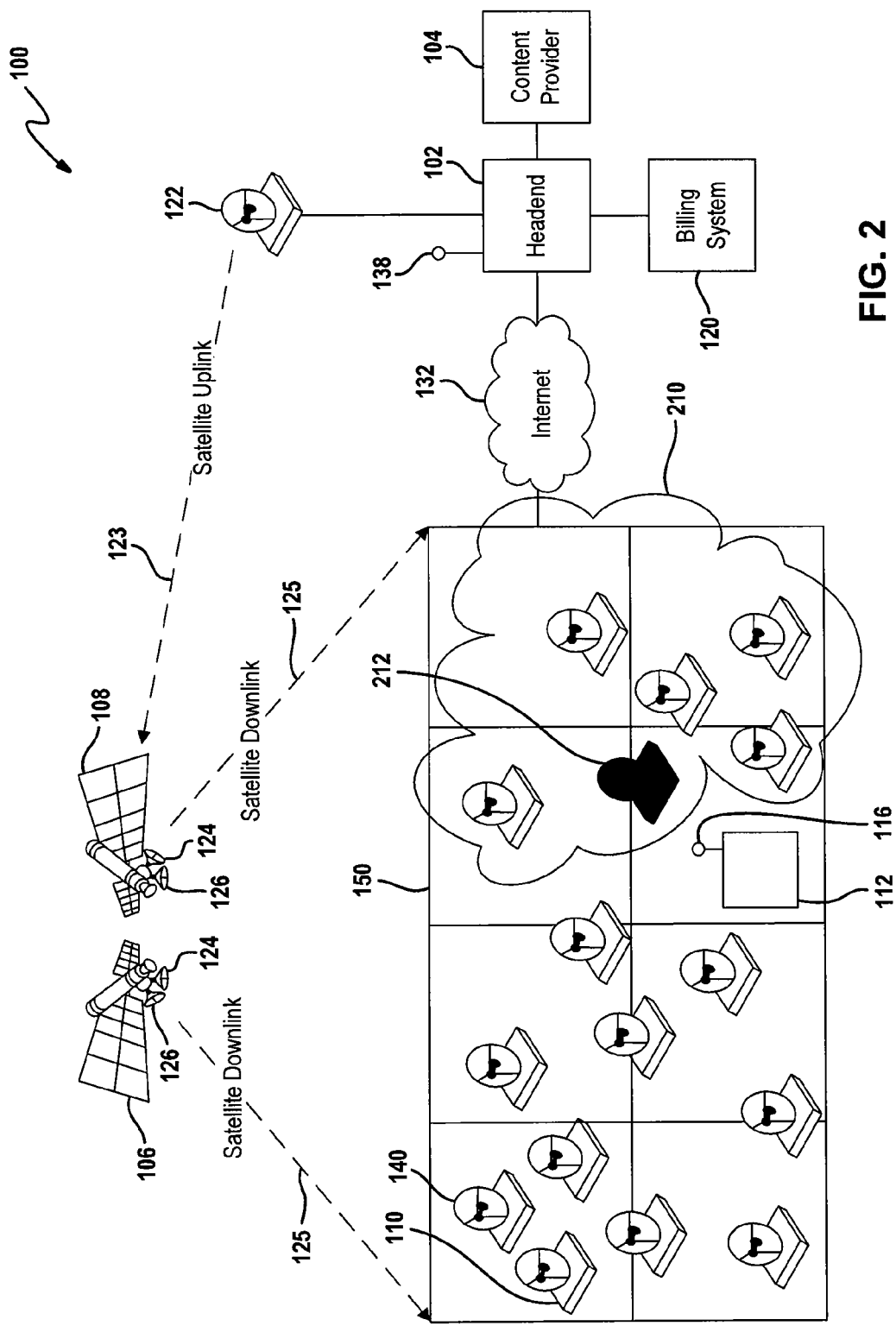
FIG. 2 is a representation of a satellite distribution system having a rain event.

Referring now to FIG. 2, a cloud 210 representing a rain, other precipitation or cloud cover over a predetermined number of geographic areas is illustrated. In these areas, the attenuation for the satellite signals is the greatest. Therefore, the signal strengths will be lower than the geographic areas without the cloud cover. Over time the cloud cover will change similarly for similarly-located user devices. A set top box of interest 212 is illustrated within the cloud 210.

Figure 3:
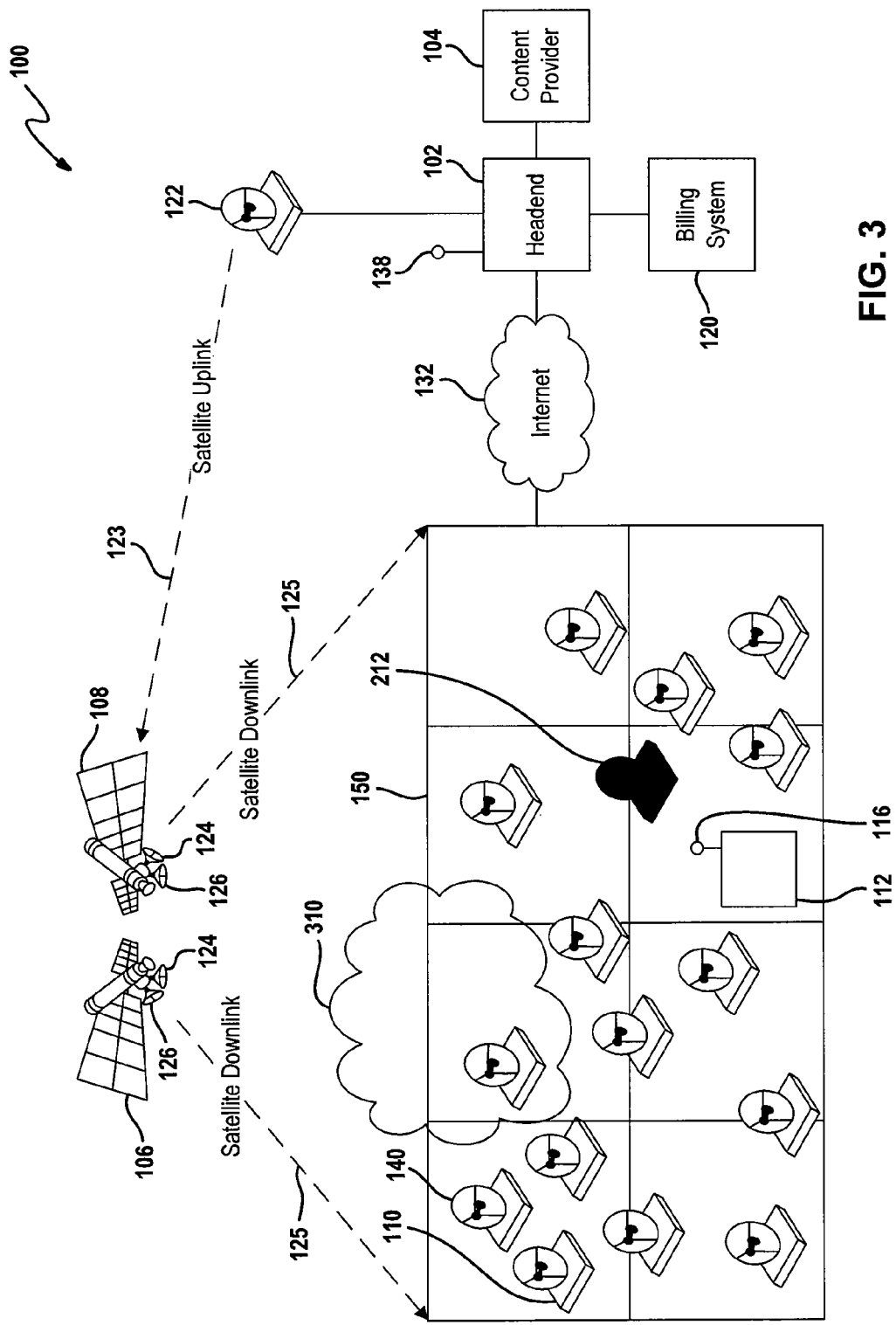
FIG. 3 is a second representation of a different weather pattern from day one in FIG. 2.

Referring now to FIG. 3, another cloud 310 representing a rain, other precipitation or cloud cover is illustrated. The cloud 310 is in a different position than cloud 210 of FIG. 2. As can be seen, the majority of the receiving devices may not experience a lower signal strength. The set top box of interest 212 is illustrated outside the cloud 310. The set top box 212 may not be authorized for the particular geographic area. For example, the set top box 212 may be authorized for the upper left-hand corner rather than the placement illustrated in FIGS. 2 and 3. Thus, there has been no rain attenuation in the upper left-hand corner region. However, the set top box 212 has experienced attenuation in FIG. 2. The measured weather conditions at the set top box 212 will vary from a weather profile for the upper left corner of the diagram. This box may not be authorized for that particular region. The determination of such will be further described below.

Figure 4:
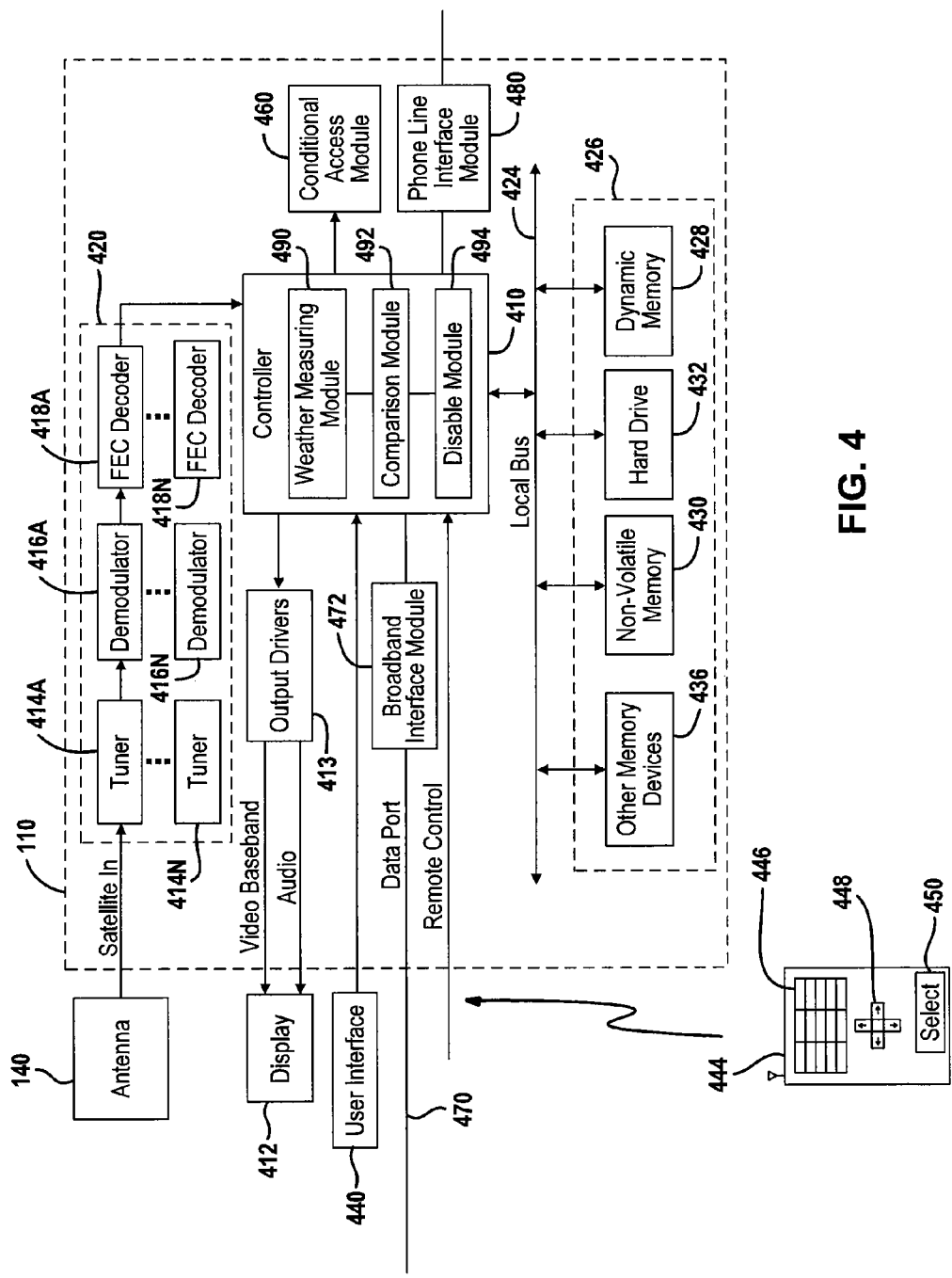
FIG. 4 is a block diagrammatic view of a set top box formed according to the present disclosure.

Referring now to FIG. 4, a user device such as a fixed user device 110 is illustrated. A similar configuration for a mobile user device 112 may also be used. The fixed user device 110 may include the fixed antenna 140. If the user device is a mobile user device, the antenna 116 may be a rotating antenna that is used to track the relative movement of the satellite or an omni-directional antenna that may receive antenna signals from various directions.

The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a receiving circuit 420. The receiving circuit 420 may include a tuner 414, a demodulator 416, a forward error correction (FEC) decoder 418 and any buffers or other functions. More than one tuner, demodulator and FEC decoder may be provided as indicated by the reference numerals "A" and "N". One constructed embodiment may include four tuners, demodulators and decoders, although various numbers of tuners, demodulators and decoders may be provided depending upon the system requirements. The tuner 414 receives the signal or data from the broadcast channel. The signal may include programming content or different types of data including program guide data. The demodulator 416 demodulates the signal to form a demodulated signal or demodulated data. The decoder 418 decodes the demodulated signal to form a decoded data or decoded signal.

The controller 410 may also be coupled to a local bus 424. The local bus 424 may be used to couple a memory module 426, including a dynamic memory 428, such as random access memory (RAM) which changes often and whose contents may be lost upon the interruption of power or boot up. The bus 424 may also be coupled to a non-volatile memory 430. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 432 may also be in communication with the local bus 424. The hard drive 432 may act as a digital video recorder for storing video and storing various data and various content. The various data stored may include metadata such as titles, actors, directors, descriptions, posters, identifiers, availability start times, availability end times, pricing data, timing data, program guide data, internal data regarding tuning, search recording and watching recorded content, a receiver identifier, a conditional access module identifier, weather data such as signal strength data logs monitored at the set top box, received geographic weather profile data, and various other types of data. The hard drive may also be interchangeable with another memory device with a large capacity.

Other memory devices 436 may also be coupled to the local bus 424. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface 440. The user interface 440 may be various types of user interfaces such as a keyboard, push buttons, a touch screen, a voice activated interface, or the like. The user interface 440 may be used to select a channel, select various information, change the volume, change the display appearance, or other functions. The user interface 440 may be used in addition to a remote control device 444. The remote control device 444 may include a keypad 446, an arrow keypad 448, and a select button 450. Inputs to the user device may be provided by the remote control device or through the user interface 440.

A conditional access card module 460 (CAM) may also be incorporated into the user device. Access cards, such as a conditional access module, may be found in DIRECTV® units. The conditional access card module 460 may provide conditional access to various channels and wireless signals generated by the system. The conditional access card module 460 may control the decryption of program content. Not having an access card or not having an up-to-date conditional access card module 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410. The call back signals may include weather or signal strength logs.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals may be provided through the broadband interface module 472, the phone interface module 480 or both.

The controller 410 may include a weather measuring module 410. The controller 410 may keep track of various weather-related physical changes such as changes to the satellite signal received through the antenna 124. In this example, the weather measuring module 490 may measure the signal strength. Other types of weather-related signals may also be measured such as the carrier noise ratio. The weather measuring module 490 may measure the signal strength of the received signal from a particular transponder or channel. The weather measuring module 490 may store the measured signal strength in one of the various types of memory within the memory module 426. The weather measuring module 490 may thus form a log of the signal strengths relative to time that is stored within the memory module 426. The weather measuring module 490 may report the time of the sample, the location of the sample (based on billing address), the satellite, the frequency, and the signal strength or CNR.

A callback signal may be generated through the broadband interface module 72 or the phone line interface module 480 for communicating the log of the signal strengths (or other weather data) to the head end.

The controller may also include a comparison module 492. The comparison module 492 receives a profile for the geographic region corresponding to the weather conditions such as the signal strength. The profile may have a maximum, minimum and variance as to what will be an acceptable value. The signal strength received for the geographic region is compiled at the head end. The head end may use signals from one or more satellites or one or more transponders in the satellites. Different transponders may have different signal strengths or characteristics based on frequency and position in the sky. The elevation angle and angular position relative to the user of the satellite may influence the received signal strengths. The comparison module 492 compares the received profile for the geographic region with the measured weather log of signal strengths stored within the set top box.

The comparison may take place over a predetermined time period such as hours or days. If the correlation between the respective profile and the log of signal strength does not correspond sufficiently, then the set top box may be disabled using the disable module 494. The disable module 494 may also be used to generate a screen display indicating the set top box has been displayed since the location of the set top box does not correspond to the registered location.

Figure 5:
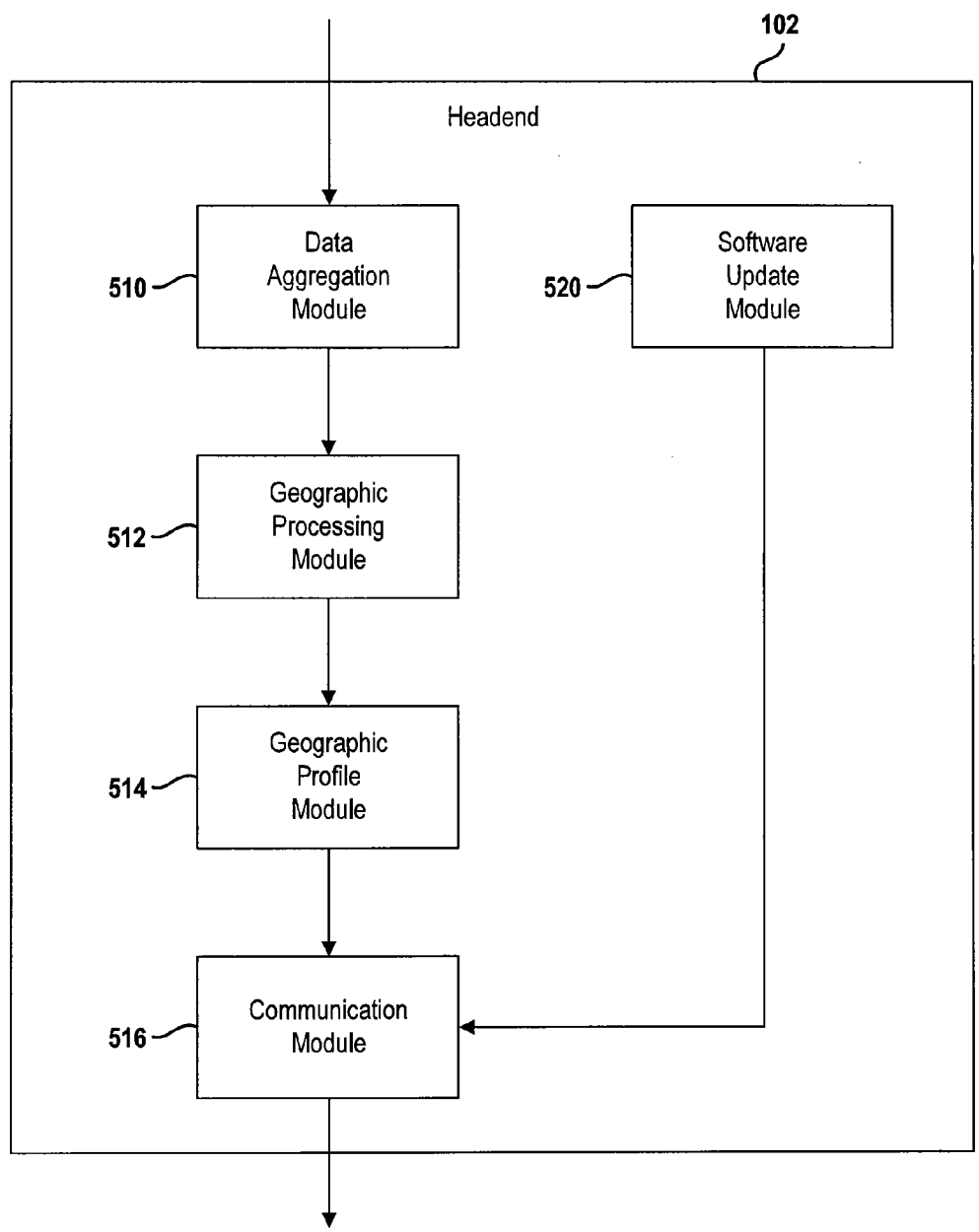
FIG. 5 is a block diagrammatic view of a content processing system according to the present disclosure.

Referring now to FIG. 5, a simplified block diagrammatic view of the head end 102 is set forth. The head end 102 may include a data aggregation module 510. The data aggregation module may be used to collect weather condition data from various set top boxes located in various geographic locations. The data aggregation module 510 may be in communication with a geographic processing module 512 that geographically processes the weather condition data based upon geography. A geographic profile module 514 may generate a geographic data profile of weather conditions for a predetermined time period. The profile is formed over time from the data received from a plurality of set top boxes. A maximum, minimum and acceptable variance may all be part of the profile for a given geographic location. The geographic data profile module 514 may be in communication with a communication module 516. The communication module 516 may communicate a weather profile or profiles to various set top boxes that will eventually be used in the comparison module 492 of FIG. 4 for comparing to the data at the set top box.

Of course, other functions may also be performed at the head end 102. One function is providing software updates to the set top box. A software update module 520 may be used to provide updates that are communicated to the set top box. The present disclosure may be performed in a retroactive manner that updates the software within the set top box to perform comparisons of the local log of signal strengths and a profile of weather from the head end. Other functions not illustrated for the head end 102, such as content processing and content communication, may also be performed at the head end 102.

Figure 6:
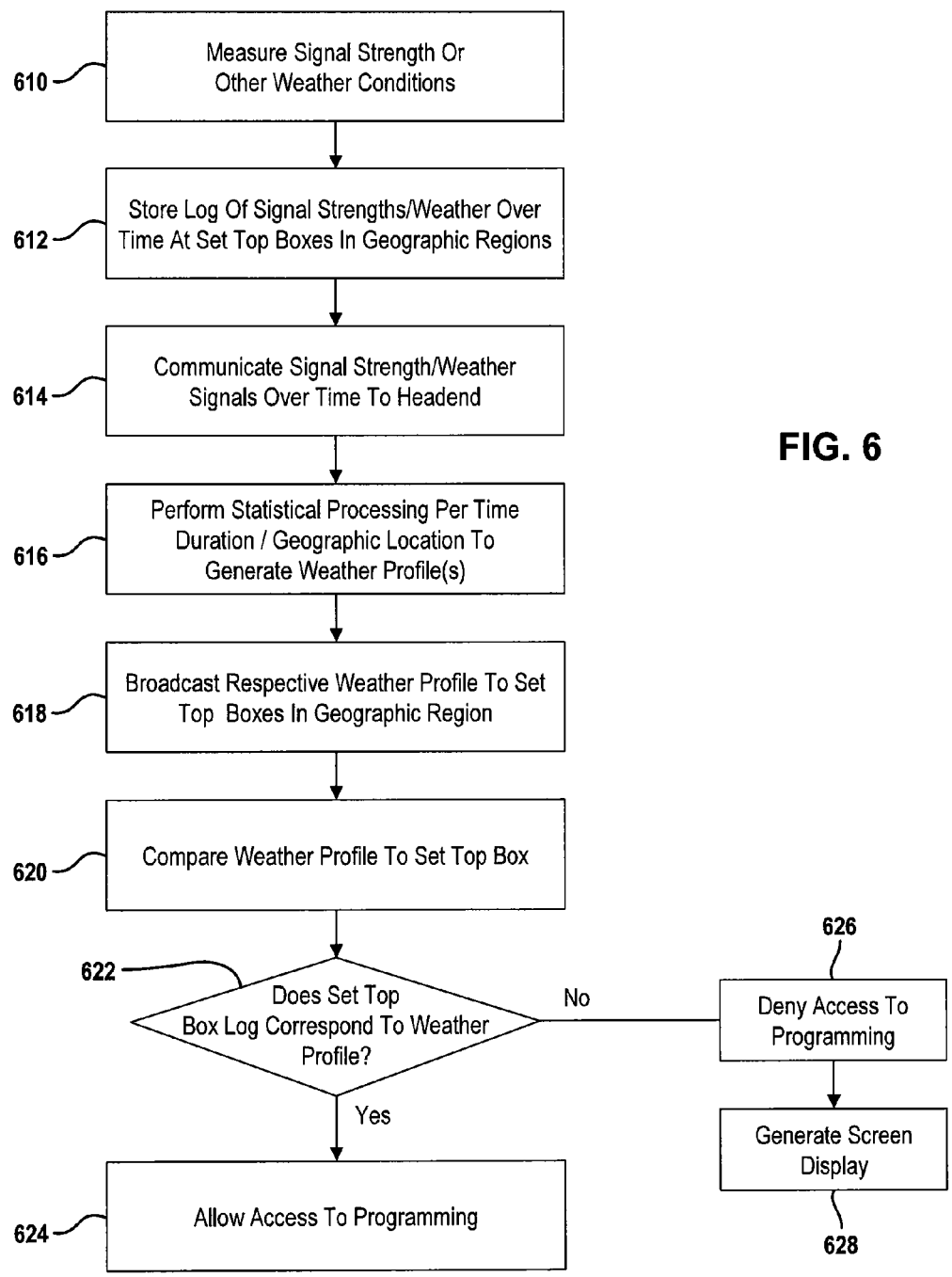
FIG. 6 is a flowchart of a method of operating the system.

Referring now to FIG. 6, a method of performing a weather comparison within a set top box is performed. In this example, signal strengths are used to correspond to the weather. However, other weather conditions may be measured or used. In step 610, the signal strengths of the received satellite signals are measured. In step 612, a log of signal strengths over time at the set top boxes is stored. A plurality of set top boxes in various geographic regions may store the signal strengths over time to form a history or log over time. In step 614, the signal strength signals in the logs are communicated over time to the head end. That is, each of the set top boxes may communicate its respective signal strength log to the head end on a periodic basis.

In step 616, statistical processing and geographic processing may take place in the head end. The statistical analysis and geographic processing may be performed for a plurality of set top boxes in each of the regions. By performing statistical processing, a weather profile may be generated for a geographic area. As mentioned above, the weather profile may be a signal strength profile. In step 618, the respective weather profile for a particular geographic region is communicated to a set top box. Various numbers of profiles based upon geographic region may be communicated to different set top boxes.

In step 620, the weather profile received is compared to the log of signal strengths corresponding to the profile time. That is, the time of the duration of the profile and the time duration of the portion of the corresponding log is compared. In step 622, when the set top box history corresponds to the profile, step 624 is performed. In step 624, access is allowed to the programming. Step 624 may also maintain access to the programming. By maintaining access to the programming, decrypting of the received program signal may be performed.

Referring back to step 622, when the set top box log does not correspond to the profile, step 626 is performed. In step 626, access to programming may be denied. That is, the ability to decode the signals may be denied by the set top box in response to the comparison. After step 626, step 628 may generate a screen display that corresponds to a warning to the user of the set top box to call customer service and that access to programming has been disabled since the set top box is not located in the proper geographic region.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
receiving a profile of weather conditions in a geographic area at a set top box based on weather conditions in the geographic area compiled from a plurality of set top boxes in the geographical area;
generating a weather log at the set top box;
comparing the profile to the weather log; and
disabling the set top box from receiving signals in response to comparing.

2. The method as recited in claim 1 wherein receiving the profile of weather conditions comprises generating weather condition data at a plurality of set top boxes and communicating the weather condition data to a head end.

3. The method as recited in claim 2 wherein receiving the profile of weather conditions comprises generating the profile of weather conditions at the head end from the weather condition data.

4. The method as recited in claim 2 wherein receiving the profile of weather conditions comprises generating the profile of weather conditions at the head end from the weather condition data and geographic data for the plurality of set top boxes.

5. The method as recited in claim 2 wherein generating weather condition data comprises generating weather condition data from signal strength data.

6. The method as recited in claim 1 wherein generating weather condition data comprises generating weather condition data from signal strength data of signals received from a satellite or a plurality of satellites.

7. The method as recited in claim 1 wherein receiving the profile comprises receiving the profile of weather conditions at the set top box from a satellite.

8. The method as recited in claim 1 wherein generating a weather log comprises determining the weather log at the set top box in response to signal strengths from a plurality of satellites.

9. The method as recited in claim 1 further comprising generating a screen display in response to comparing.

10. A method comprising:
   communicating signal strengths from a plurality of set top boxes to a head end;
   generating a profile of the signal strengths in a geographic area;
   communicating the profile to a first set top box;
   generating a signal strength log at the first set top box;
   comparing the signal strength log and the profile; and
   disabling the set top box from receiving signals in response to comparing.

11. The method as recited in claim 10 wherein communicating the profile to the first set top box comprises communicating the profile to the first set top box through a satellite.

12. The method as recited in claim 10 further comprising generating a screen display in response to comparing.

13. A system comprising:
   a set top box receiving a profile of weather conditions in a geographic area compiled from a plurality of set top boxes in the geographic area, generating a weather log, comparing the weather log and the profile and disabling the set top box from receiving signals in response to comparing.

14. The system of claim 13 further comprising a head end communicating the profile of weather conditions to a set top box.

15. The system of claim 14 wherein the head end generates the profile from set top box weather condition data from the plurality of set top boxes.

16. The system of claim 14 wherein the head end generates the profile of weather conditions and communicates the profile to the set top box.

17. The system of claim 14 wherein the head end generates the profile of weather conditions and communicates the profile of weather conditions to the set top box through a satellite.

18. The system of claim 13 wherein the weather log comprises a signal strength log and the profile comprises a signal strength profile.

19. The system of claim 13 wherein the set top box generates a screen display in response to comparing.

* * * * *